(12) United States Patent
Forster

(10) Patent No.: US 9,026,041 B2
(45) Date of Patent: May 5, 2015

(54) PORTABLE RADIO-FREQUENCY REPEATER

(75) Inventor: Ian James Forster, Essex (GB)

(73) Assignee: Avery Dennison Corporation, Glendale, CA (US)

(*) Notice: Subject to any disclaimer, the term of this patent is extended or adjusted under 35 U.S.C. 154(b) by 594 days.

(21) Appl. No.: 13/293,195

(22) Filed: Nov. 10, 2011

(65) Prior Publication Data

US 2013/0122803 A1    May 16, 2013

(51) Int. Cl.
H04B 7/15 (2006.01)
G06K 7/10 (2006.01)
H04B 7/155 (2006.01)

(52) U.S. Cl.
CPC ............ *G06K 7/10009* (2013.01); *H04B 7/155* (2013.01)

(58) Field of Classification Search
CPC .......................... G06K 7/10009; H04B 7/155
See application file for complete search history.

(56) References Cited

U.S. PATENT DOCUMENTS

| 2005/0073435 A1* | 4/2005 | Voeller et al. ................. 340/933 |
| 2010/0147226 A1* | 6/2010 | Tsengas ........................ 119/501 |
| 2010/0289627 A1* | 11/2010 | McAllister et al. ........ 340/10.42 |

* cited by examiner

*Primary Examiner* — Ed Urban
*Assistant Examiner* — Mohammed Rachedine
(74) *Attorney, Agent, or Firm* — Avery Dennison Retail Information Services LLC

(57) ABSTRACT

A portable radio-frequency repeater includes a housing and a transceiver. The transceiver is disposed at least partially within the housing and configured to alternatively operate in a transmitting mode and a sleep mode. The transceiver includes an antenna and a control unit. The control unit is in electrical communication with the antenna. When the transceiver operates in the transmitting mode, the control unit is configured to receive an RFID signal from the antenna, convert the RFID signal into a converted RFID signal, and transmit the converted RFD signal to the antenna. When the transceiver operates in the sleep mode, the control unit is configured to detect an interrogation signal from the antenna and not to transmit any converted RFID signal to the antenna.

13 Claims, 15 Drawing Sheets

PORTABLE RADIO-FREQUENCY REPEATER

TECHNICAL FIELD OF THE INVENTION

A portable radio-frequency repeater is provided in cooperation with a reader system to facilitate the capture of signals from a plurality of transponders. The portable repeater includes a housing and a transceiver and which is capable of being activated based on a pre-determined stimulus, such as signal strength in order to enable the reading of the tagged items.

BACKGROUND OF THE INVENTION

Conventionally, a radio frequency identification (RFID) system includes an RFID reader that is configured to communicate with a plurality of RFID transponders by way of radio frequency (RF) transmissions. Typically, each of the RFID transponders is associated with an RFID-enabled item, such as a shipping parcel, for example, and stores particularized data about the associated item (e.g., manufacturer, manufacturing date, destination, and/or account information). The RFID reader communicates with the RFID transponders to gather particularized data about each RFID-enabled item. Oftentimes, a plurality of RFID-enabled items are arranged in a group such as to facilitate shipping (e.g., palletized, retained in a cargo container). When the RFD reader attempts to communicate with each of the plurality of RFID-enabled items within the group, some of the items located along the perimeter of the group may affect the ability of the RFID reader to communicate with some of the RFID transponders (e.g., due to loss of signal power or signal degradation).

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In accordance with one embodiment, a portable RF repeater comprises a housing and a transceiver. The transceiver is disposed at least partially within the housing and is configured to alternatively operate in a tag reading and data relay mode and a sleep mode. The transceiver includes an antenna and a control unit. The control unit is in electrical communication with the antenna. When the transceiver operates in the tag reading and data relay mode, the control unit is configured to receive an RFID signal from the antenna, convert the RFID signal into a converted REID signal, and transmit the converted RFID signal to the antenna to relay the result to the reader system. The relay of tag data can be achieved by a number of means, such as use of a separate data link, operating in the 2.45 GHz band, such as Bluetooth® or via a suitable wireless LAN, or by the repeater emulating a tag of the same data as that to be relayed. When the transceiver operates in the sleep mode, the control unit is configured to detect an interrogation signal from the antenna and not to transmit any converted RFID signal to the antenna. The transceiver is configured to switch operation from the sleep mode to the tag reading mode upon detection by the control unit of the interrogation signal.

The activation from the sleep mode occurs as a result of predetermined stimulus (RF signal strength) or set of external stimuli (for example, presence of external read, but potentially sensors such as light or movement, user activation, or activation at a pre-defined threshold). Should the external reader require help to read tags in a local zone around the repeater, cloaking of the repeater antennas (either selectively, partially or totally) to decrease the impact on local groups of tags for a period may be done. Determination of the read rate success can be achieved by monitoring the protocol and/or tag re-transmissions.

If the reader requires help with determining read rates, reading the local tags can be accomplished by having a transmit signal that is synchronized to an external reader system to avoid interference. This can be performed by relaying tag ID's to the external reader system by either a UHF data link, emulation of a series of tags with the ID's of the tags in the local group, emulation of a single tag with extended memory containing the ID's of all the tags in the local group or transmission of the data by other method such as WLAN or Bluetooth®. Once the reader has completed reading the tags, then the reader returns to sleep mode.

In accordance with another embodiment, the interrogation signal activates the transceiver to perform one of a series of functions and to enable the reading of a plurality of tagged items by a reader system.

In accordance with yet another embodiment, the transceiver further includes a timer, wherein the timer is configured to switch operation of the transceiver from the transmitting mode to the sleep mode after a predetermined period of time following detection by the control unit of the interrogation signal.

In accordance with yet another embodiment, the portable RF repeater further includes a power source configured to power the transceiver and at least partially disposed within the housing.

In accordance with yet another embodiment, the power source includes at least one of a capacitor and a battery.

In accordance with yet another embodiment, the power source includes a battery, and the antenna includes a conductive structure coupled with an exterior surface of the battery.

In accordance with yet another embodiment, the antenna includes a three-dimensional antenna.

In accordance with yet another embodiment, the antenna includes one of a slot antenna, a patch antenna, and a dipole antenna.

In accordance with yet another embodiment, the antenna includes a dipole antenna, and the dipole antenna includes a triple-crossed dipole antenna.

In accordance with yet another embodiment, the antenna is formed from a ceramic material.

In accordance with yet another embodiment, the antenna has an antenna impedance, and when the transceiver is in the sleep mode, the antenna impedance is increased as compared to when the transceiver is in the transmitting mode.

In accordance with yet another embodiment, the control unit is configured to measure a signal power of the interrogation signal and switch operation from the sleep mode to the transmitting mode when the signal power is below a threshold power.

In accordance with yet another embodiment, the antenna is configured to receive the RFID signal from a plurality of RFID transponders.

In accordance with yet another embodiment, the antenna is configured to receive the interrogation signal from an RFID reader.

In accordance with yet another embodiment, the control unit is configured to detect acknowledge messages transmitted from an REID reader to RFID transponders and switch operation from the sleep mode to the transmitting mode when the ratio of acknowledge message quantity to RFID transponders is below a threshold level.

In accordance with yet another embodiment, a portable RF repeater includes a housing, a transceiver, and a battery. The transceiver is disposed at least partially within the housing. The transceiver is configured to alternatively operate in a transmitting mode and a sleep mode. The transceiver includes a triple-crossed dipole antenna and a control unit. The triple-crossed dipole antenna is configured to receive an RFID signal from a plurality of RFID transponders and to receive an interrogation signal from an RFID reader. The control unit is in electrical communication with the triple-crossed dipole antenna. The battery is disposed at least partially within the housing and is configured to power the transceiver. When the transceiver operates in the transmitting mode, the control unit is configured to receive the RFID signal from the triple-crossed dipole antenna, convert the RFID signal into a converted RFID signal, and transmit the converted RFID signal to the triple-crossed dipole antenna. When the transceiver operates in the sleep mode, the control unit is configured to detect the interrogation signal from the triple-crossed dipole antenna and not to transmit any converted RFID signal to the triple-crossed dipole antenna.

In accordance with yet another embodiment, the control unit is configured to detect acknowledgement messages transmitted from an RFID reader to RFID transponders and switch operation from the sleep mode to the transmitting mode when the ratio of acknowledgement message quantity to RFID transponders is below a threshold level.

In accordance with yet another embodiment, the triple-crossed dipole antenna includes a conductive structure coupled with an exterior surface of the battery.

In accordance with yet another embodiment, a portable RF repeater includes a housing and a transceiver. The transceiver is disposed at least partially within the housing. The transceiver is configured to alternatively operate in a transmitting mode and a sleep mode. The transceiver includes an antenna and a control unit. The antenna has an antenna impedance and is configured to receive an RFID signal from a plurality of RFID transponders and to receive an interrogation signal from an RFID reader. The control unit is in electrical communication with the antenna. When the transceiver operates in the transmitting mode, the control unit is configured to receive the RFID signal from the antenna, convert the RFID signal into a converted RFID signal, and transmit the converted RFID signal to the antenna. When the transceiver operates in the sleep mode, the antenna impedance is increased as compared to when the transceiver is in the transmitting mode. Also, when the transceiver operates in the sleep mode, the control unit is configured to detect the interrogation signal from the antenna and not to transmit any converted RFID signal to the antenna. The transceiver is configured to switch operation from the sleep mode to the transmitting mode upon detection by the control unit of the interrogation signal.

In a further exemplary embodiment of the presently described invention, a method of using a portable RFID repeater is described and includes the steps of initially providing a RFID repeater that has a transceiver disposed within a housing and has a sleep mode and an activated mode. Next, a plurality of articles with at least some of the articles having RFID transponders disposed thereon is supplied and a plurality of signals is generated from the transponders. The plurality of signals is received at a RFID reader and if the RFID reader is able to determine if it is receiving and reading the plurality of signals, the RFID repeater is activated to change from the sleep mode to the activated mode. Next, the plurality of signals is read to determine ID's for each of the plurality of articles and the IDs from the RFID repeater is relayed to the reader system. Finally, the RFID repeater is deactivated to change from an activated mode to a sleep mode.

In a yet still further exemplary embodiment of the presently described invention, a method for reading a plurality of RFID transponders is provided and includes the steps of initially providing a plurality of RFID transponders and then generating a signal to read the RFID transponders. A response is received from each of the RFID transponders and a portable RFID repeater is activated based on the response that is received from the RFID transponders. Next, the response from each of the RFID transponders is read to determine an ID and the response is relayed from the RFID repeater to the RFID reader and the RFID repeater is deactivated.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 18 is a schematic depicting a repeater for attachment to an article for inventory or supply chain management;

FIG. 19 is a schematic showing a portable reader in connection with a repeater for inventory or supply chain management;

FIG. 20 is a schematic depicting a RFID reader and portable reader in connection with a repeater for inventory or supply chain management;

FIG. 21 is a block diagram showing a RFID modifier as provided in accordance with one embodiment of the present invention;

FIG. 22 is a schematic showing an additional embodiment as provided in accordance with the present invention;

FIG. 23 is a schematic showing an additional embodiment as provided in accordance with the present invention; and FIG. 24 is a schematic showing an additional embodiment as provided in accordance with the present invention.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

Figure 1:
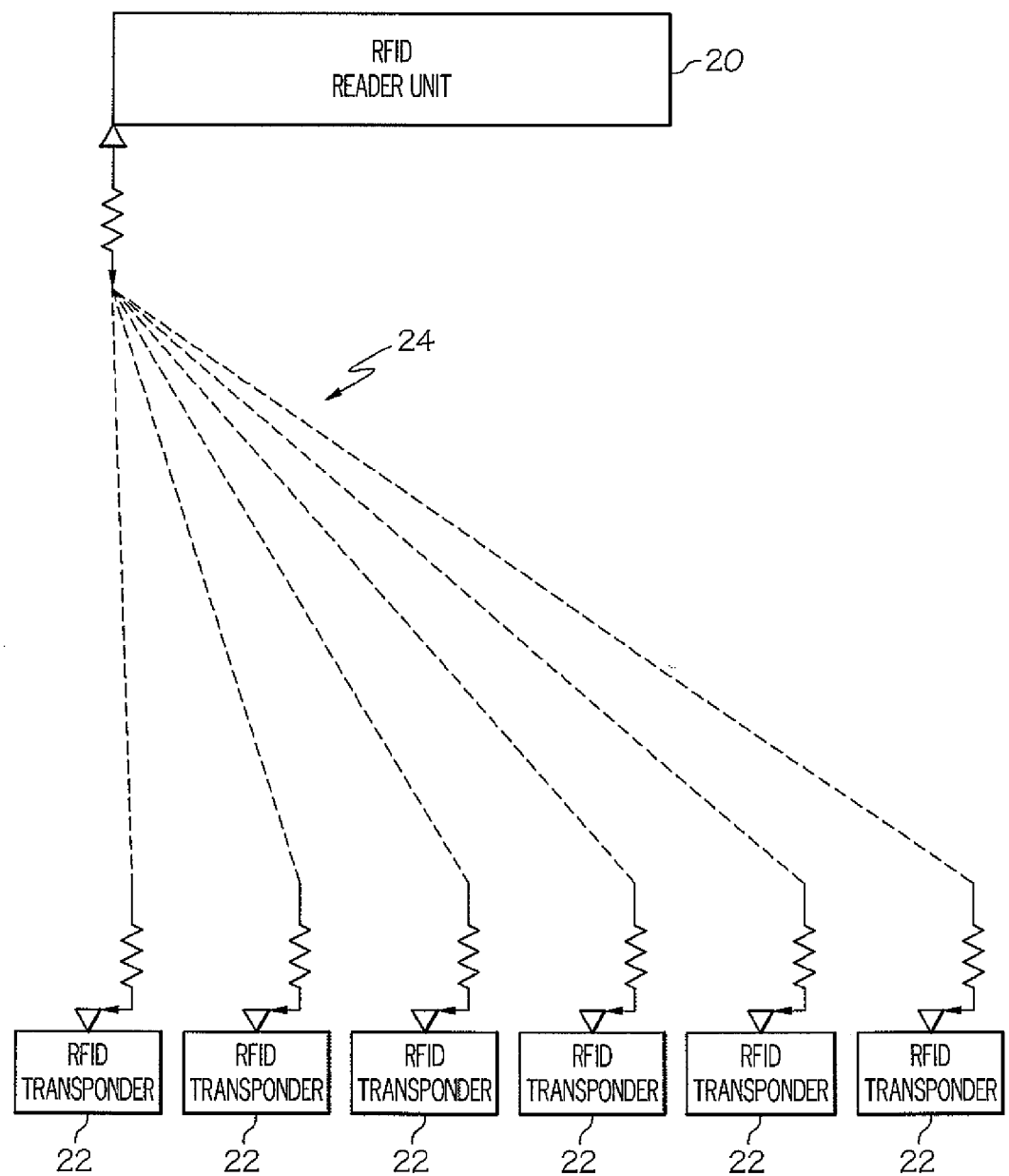
FIG. 1 is a schematic view depicting signal transmission within a conventional RFID system.
Figure 2:
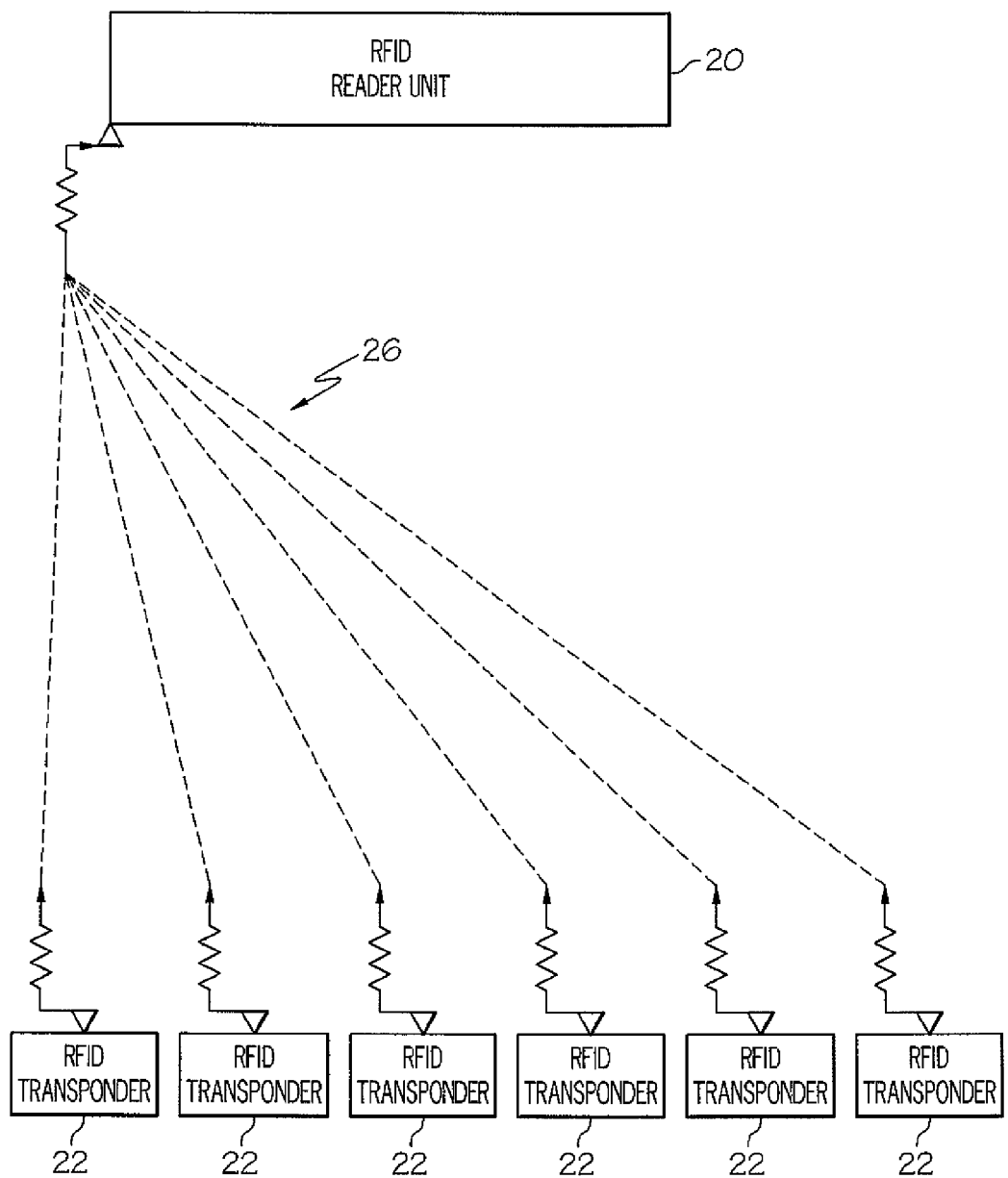
FIG. 2 is another schematic view depicting signal transmission within the conventional RFID system.

FIGS. 1 and 2 illustrate a conventional RFID system that includes an RFID reader 20 configured to communicate with a plurality of RFID transponders 22. As is common, the REID reader 20 is configured to interrogate the RFID transponders 22. When the RFID reader 20 interrogates the RFID transponders 22, data stored on each RFID transponder 22 (e.g., RFID data) can be transmitted back to the RFID reader 20.

The RFID transponders 22 can be associated with different items (e.g., RFID-enabled items). For example, the RFID transponder 22 can be associated with a package, airline luggage, store inventory, etc. In each case, the RFID transponder 22 carries RFID-data that facilitates identification of the RFID-enabled item associated with the RFID transponder 22. For example, if the RFID transponder 22 is associated with a package, the RFID-data stored on the RFID transponder 22 can include the package's origin address, origination date, destination address, estimated arrival date and the sender's account information. In another example, if the RFID transponder 22 is associated with airline luggage, the RFID-data stored on the RFID transponder 22 can include the flight information, destination information, layover information, and passenger information. The RFID transponders 22 can be associated with any of a variety of items.

In one embodiment, as illustrated in FIG. 1, to gather information from the RFID transponders 22, the RFID reader 20 can transmit an interrogation signal 24 to the plurality of RFID transponders 22. As illustrated in FIG. 2, in response to the interrogation signal 24, each RFID transponder 22 can transmit RFID-data to the RFID reader via an RFID signal 26.

It will be appreciated, however, that a variety of disturbances can affect proper transmission of the interrogation signal 24 and/or the RFID signal 26. For example, the distance between the RFID reader 20 and the plurality of RFID transponders 22 can affect proper transmission of the interrogation signal 24 and/or RFID signal 26. When the RFID reader 20 is immediately adjacent to the plurality of RFID transponders 22, transmission of the interrogation signal 24 and/or RFID signal 26 may not be adversely affected. However, as the distance between the RFID reader 20 and the RFID transponders 22 increases, transmission of the interrogation signal 24 and/or RFID signal 26 may be increasingly affected. In another example, when the RFID transponders 22 are grouped together, some of the RFID transponders 22 may obstruct transmission of the interrogation signal 24 and/or RFID signal 26 corresponding with some other ones of the RFID transponders 22.

Figure 3:
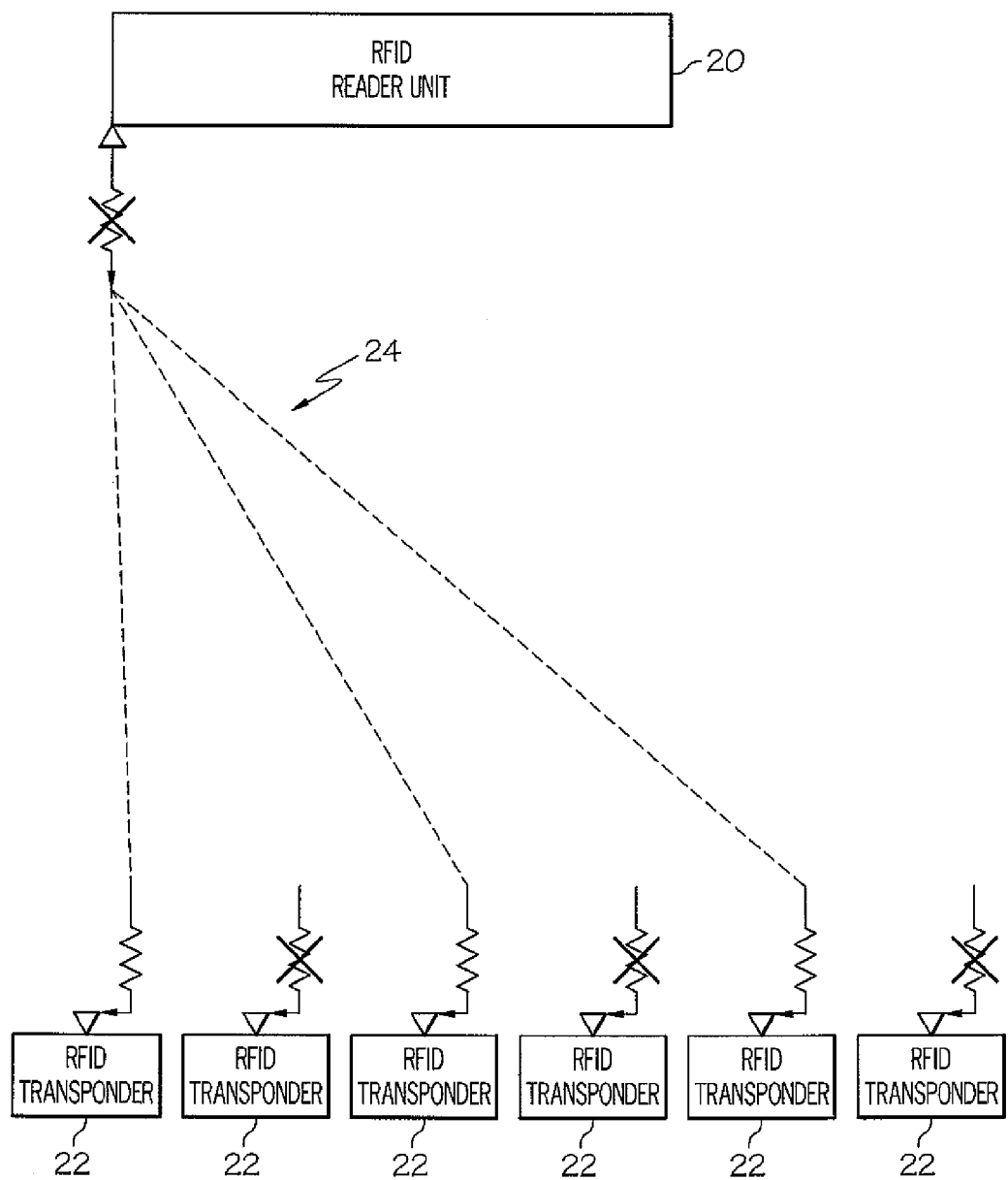
FIG. 3 is yet another schematic view depicting signal transmission within the conventional RFID system.
Figure 4:
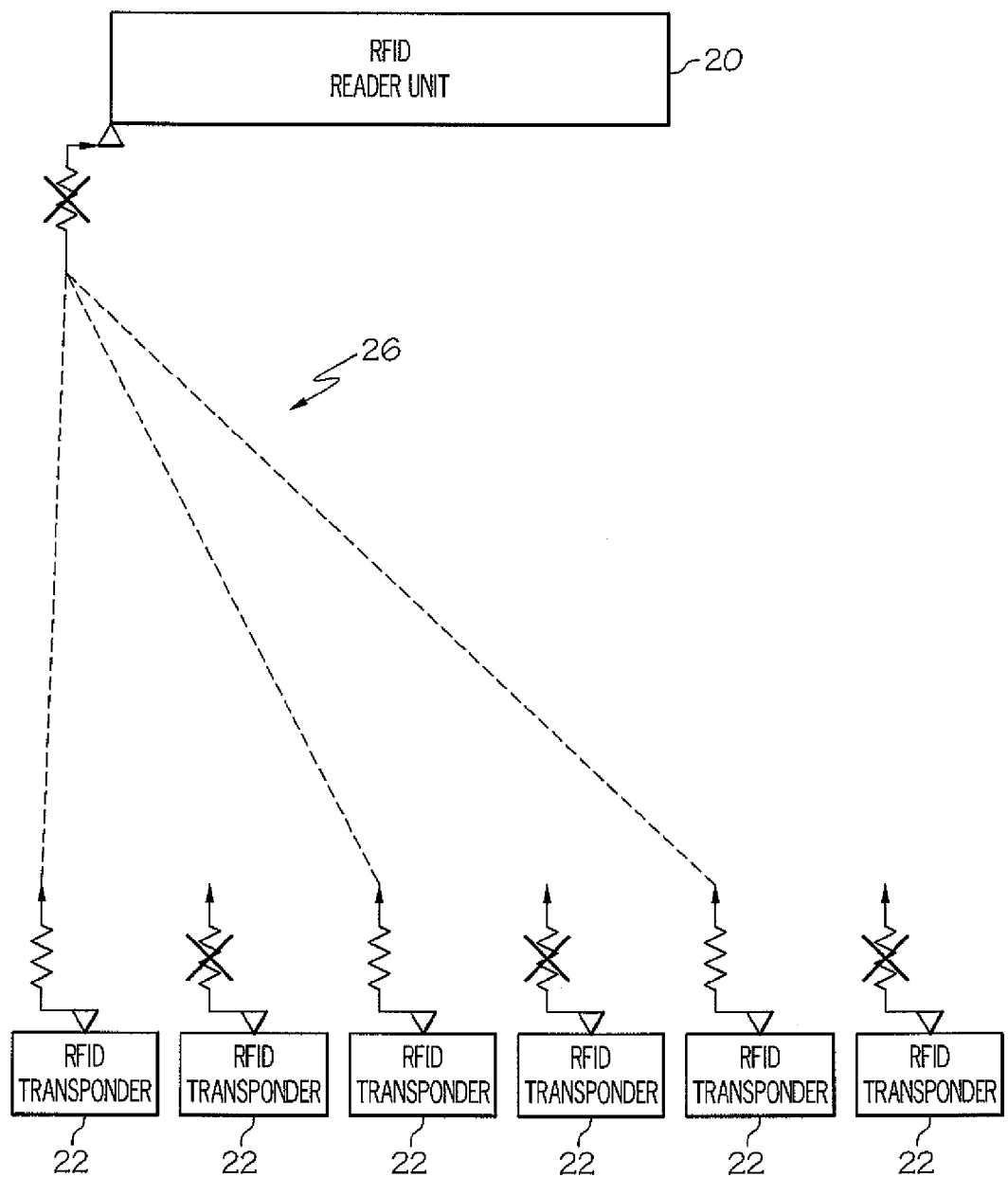
FIG. 4 is yet another schematic view depicting signal transmission within the conventional RFID system.
Figure 5:
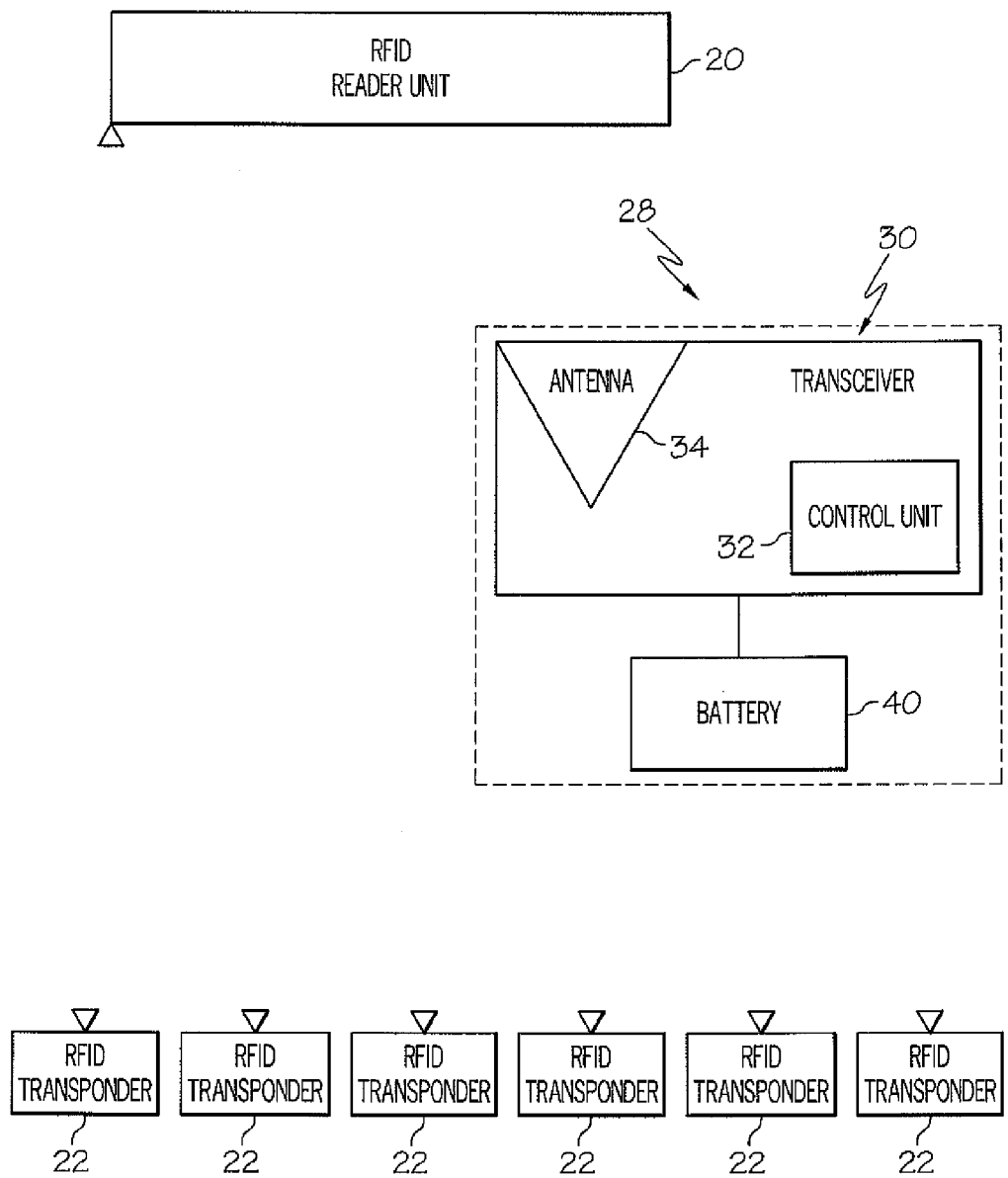
FIG. 5 is a schematic view depicting an RFID system which incorporates an RF repeater according to one embodiment.

Improper transmission of the interrogation signal 24 and/or RFID signal 26 can affect whether RFID-data from the RFID transponders 22 is effectively gathered by the RFID reader 20. In one example, as illustrated in FIG. 3, the interrogation signal 24 sent to the RFID transponders 22 may not reach some of the RFID transponders 22. Accordingly, certain of the RFID transponders 22 will not transmit the RFID signal 26 and the associated RFID-data back to the RFID reader 20. In another example, as illustrated in FIG. 4, RFID signals 26 sent from certain of the RFID transponders 22 may never reach the RFID reader 20. Accordingly, the RFID signal 26 and associated RFID data is never gathered by the RFID reader 20.

In connection with the views and examples of FIGS. 5-17, wherein like numbers indicate the same or corresponding elements throughout the views, an RF repeater 28 can be provided to facilitate effective communication between the RFID reader 20 or external reader system and the RFID transponders 22 associated with various articles. The RF repeater 28 can include a transceiver 30. The transceiver 30 can include a control unit 32 in electrical communication with an antenna 34. The RF repeater can be used to assist or facilitate the reading of the transponders or RFID devices by the reader system 20 so as to obtain the individual ID's or other information from the individual transponders 22.

Figure 6:
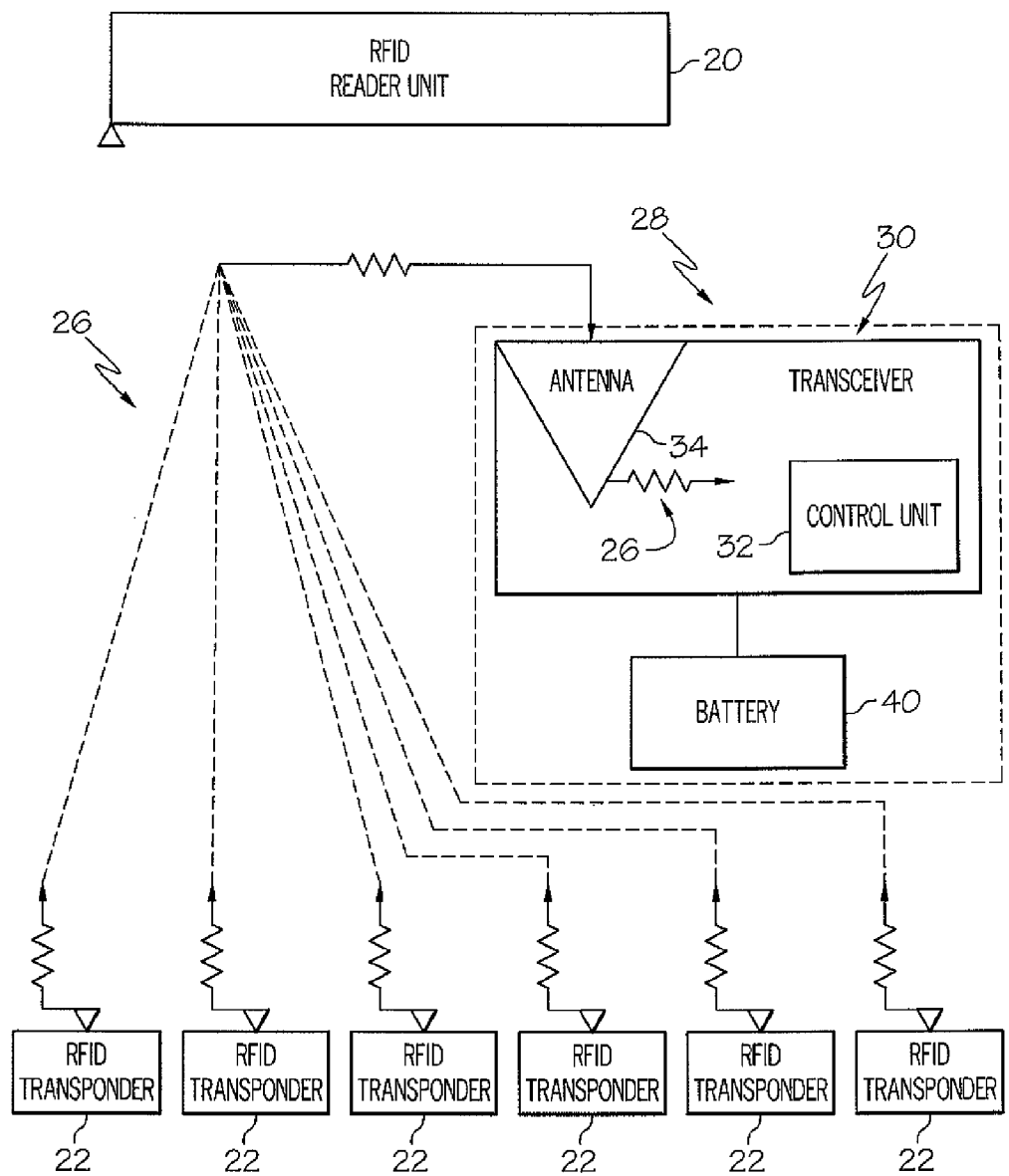
FIG. 6 is a schematic view depicting signal transmission within the RFID system of FIG. 5.
Figure 7:
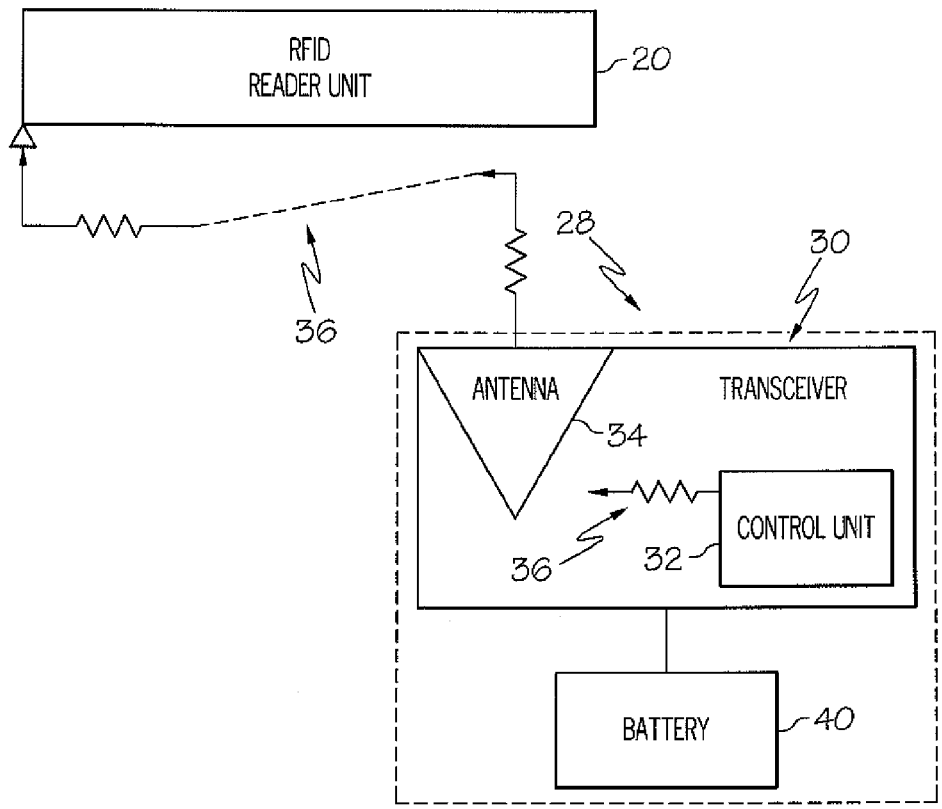
FIG. 7 is another schematic view depicting signal transmission within the RFID system of FIG. 5.
Figure 7:
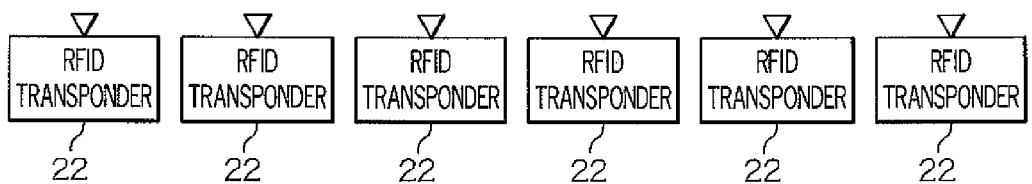

In one embodiment, as illustrated in FIGS. 6 and 7, the RF repeater 28 can be introduced into the RFID system to facilitate transmission of the RFID signals 26 to the RFID reader 20. As illustrated in FIG. 6, the RFID signals 26 from the RFID transponders 22 can be received by the antenna 34. The control unit 32 can then be configured to receive each RFID signal 26 from the antenna 34. The control unit 32 can be configured to convert each of the RFID signals 26 into a converted RFID signal 36 and transmit the converted RFID signal 36 to the antenna 34, as illustrated in FIG. 7. The antenna 34 can then transmit the converted RFID signal 36 to the RFID reader 20. In one embodiment, the control unit 32 can convert the RFID signal 26 into the converted RFID signal 36 by increasing the power of the RFID signal 36. In another embodiment, the control unit 32 can convert the RFID signal 26 into the converted RFID signal 36 by increasing the signal to noise ratio of the RFID signal 26. However, it will be appreciated that the control unit 32 can convert the RFID signal 26 into the converted RFID signal 36 in any of a variety of suitable alternative manners. The reader and/or portable repeater can also be used to cloak a portion of the plurality of signals being generated by the transponders.

Figure 8:
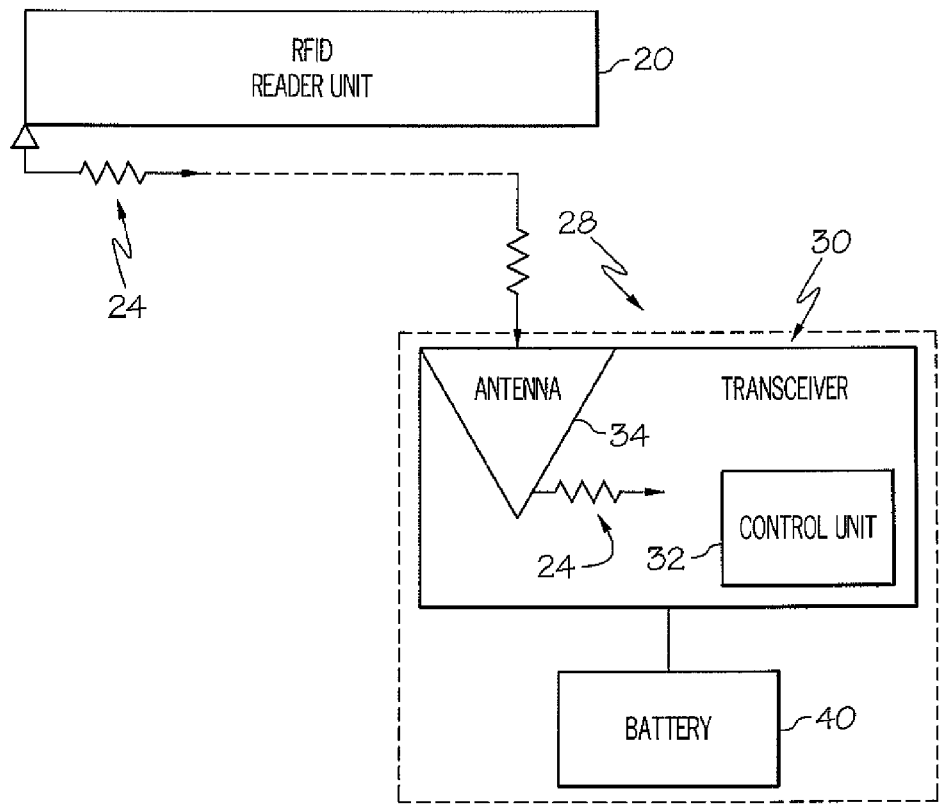
FIG. 8 is yet another schematic view depicting signal transmission within the RFID system of FIG. 5.
Figure 8:
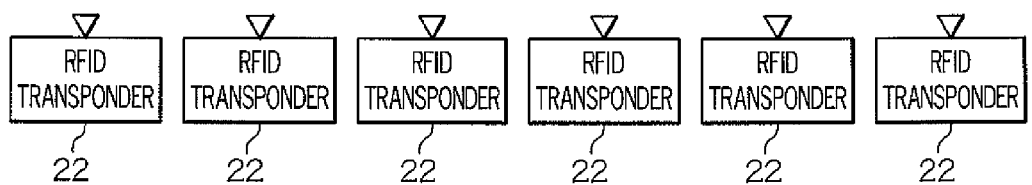
Figure 9:
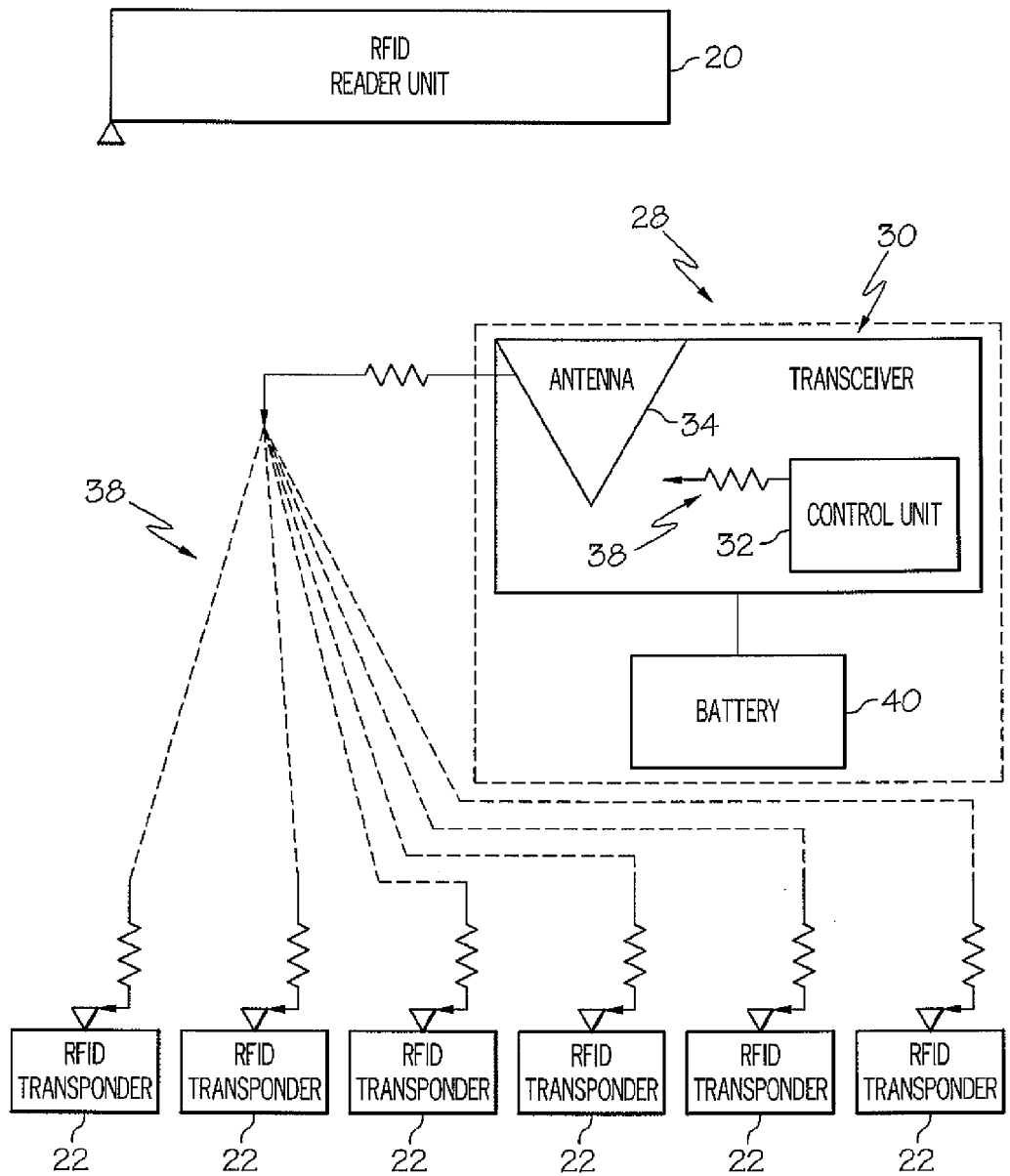
FIG. 9 is still another schematic view depicting signal transmission within the RFID system of FIG. 5.

As illustrated in FIGS. 8 and 9, the RF repeater 28 can additionally or alternatively be configured to facilitate transmission of the interrogation signal 24 from the RF reader 20 to the RFID transponders 22. The RF repeater 28 can be activated based on any one of a number of predetermined stimuli. As illustrated in FIG. 8, the interrogation signal 24 from the RFID reader 20 can be received by the antenna 34. The control unit 32 can be configured to receive the interrogation signal 24 from the antenna 34. The control unit 32 can be configured to then convert the interrogation signal 24 into a converted interrogation signal 38 and transmit the converted interrogation signal 38 to the antenna 34, as illustrated in FIG. 9. The antenna 34 can then transmit the converted interrogation signal 38 to the RFID transponders 22. In one embodiment, the control unit 32 converts the interrogation signal 24 into the converted interrogation signal 38 by increasing the power of the interrogation signal 24. In another embodiment, the control unit 32 converts the interrogation signal 24 into the converted interrogation signal 38 by increasing the signal to noise ratio of the interrogation signal 24. However, it will be appreciated that the control unit 32 can convert the interrogation signal 24 into the converted interrogation signal 38 in any of a variety of suitable alternative manners.

It will be appreciated that the transceiver 30 can be configured to facilitate either unidirectional communication or bidirectional communication. For example, in one embodiment, each of the RFID transponders 22 can be configured to transmit the RFID signal 26 without requiring receipt of the interrogation signal 24. In such an example, the transceiver 30 might not receive the interrogation signal 24 and/or transmit the converted interrogation signal 38. In another embodiment, each of the RFID transponders 22 is configured to transmit the RFID signal 26 only when the RFID transponder 22 is interrogated. In such an example, the transceiver 30 can receive the interrogation signal 24 and transmit the converted interrogation signal 38 to the RFID transponders 22. When each of the RFID transponders 22 responds by transmitting the RFID signal 26, the transceiver 30 can receive the RFID signal 26 and transmit the converted RFID signal 36 to the to the REID reader 20. It will be appreciated that the control unit 32 can comprise a microprocessor, a digital signal processor, and/or any of a variety of suitable electronic components.

The transceiver 30 can be configured to alternatively operate in a sleep mode and a transmitting mode. When the transceiver 30 operates in the sleep mode, the transceiver 30 can be effectively "turned off". In one embodiment, when the transceiver 30 operates in the sleep mode, the control unit 32 is configured not to transmit converted RFID signals 36 to the antenna 34. In another embodiment, when the transceiver 30 operates in the sleep mode, the control unit 32 is configured to not receive any RFID signals 26 from the antenna 34. In yet another embodiment, when the transceiver 30 operates in the sleep mode, the impedance of the antenna 34 is increased (e.g., tuned or loaded). In such an embodiment, the effective aperture of the antenna 34 can be reduced, thereby minimizing the possibility of coupling with the RFID transponders 22. In yet another embodiment, when the transceiver 30 operates in the sleep mode, the control unit 32 is configured to power down.

When the transceiver 30 operates in the transmitting mode, the transceiver 30 can facilitate communication between the RFID reader 20 and the RFID transponders 22, as described above. For example, when the transceiver 30 operates in the transmitting mode, the RF repeater 28 facilitates transmission of the RFID signals 26 to the RFID reader 20 and/or facilitates transmission of the interrogation signals 24 to the RFID transponders 22.

Typically, the transceiver 30 operates in the sleep mode until an event triggers operation of the transceiver 30 in the transmitting mode. In one embodiment, when the RFID reader 30 sends the interrogation signal 24 to the RFID transponders 22, the transceiver 30 can switch from the sleep mode to the transmitting mode. In such an embodiment, while the transceiver 30 operates in the sleep mode, the control unit 32 can be configured to monitor the antenna 34 to detect for receipt of the interrogation signal 24 by the antenna 34. So long as the transceiver 30 does not receive an interrogation signal 24 (e.g., the RFID reader 20 is not requesting data from the RFID transponders 22), the transceiver 30 can remain in the sleep mode. However, once the control unit 32 detects an interrogation signal 24, the transceiver 30 can switch operation from the sleep mode to the transmitting mode.

In another embodiment, the RFID repeater 28 can detect when the interrogation signal 24 is too weak to reach the RFID transponders 22, and can, upon such detection, switch the transceiver 30 from the sleep mode to the transmitting mode. In such an embodiment, while the transceiver 30 operates in the sleep mode, the control unit 32 can be configured to measure a signal power (e.g., RMS power) of the interrogation signal 24. So long as the signal power is above a particular predetermined threshold power, the transceiver 30 can remain in the sleep mode. However, if the control unit 32 detects that the signal power drops below the threshold power, the transceiver 30 can switch operation from the sleep mode to the transmitting mode.

In yet another embodiment, the RFID repeater 28 can detect when the RFID signal 26 is too weak to reach the RFID reader 20, and can, upon such detection, switch the transceiver 30 from the sleep mode to the transmitting mode. In such an embodiment, while the transceiver 30 operates in the sleep mode, the control unit 32 can measure a signal power (e.g., RMS power) of the RFID signal 26. So long as the signal power is above a particular predetermined threshold power, the transceiver 30 can remain in the sleep mode. However, if the control unit 32 detects that the signal power of the RFID signals 26 drops below the threshold power, the transceiver 30 can switch operation from the sleep mode to the transmitting mode.

In yet another embodiment, the RFID repeater 28 can be configured such that, if the interrogation signal 24 and/or the RFID signals 26 are not reaching the respective RFID transponders 22 and RFID reader 20, the transceiver 30 can switch from the sleep mode to the transmitting mode. In such an embodiment, the RFID reader 20 can be configured to transmit acknowledgement messages to the RFID transponders 22 upon receipt of RFID signals 26 in response to an interrogation signal 24. While the transceiver 30 operates in the sleep mode, the control unit 32 can be configured to detect the acknowledgement messages. So long as the number of RFID transponders is known, the control unit 32 can be configured to determine the ratio of acknowledgement messages detected by the control unit 32 as compared with the total number of RFID transponders 22 in a given group. If this ratio is above a predetermined threshold level, the transceiver 30 can remain in the sleep mode. However, if the control unit 32 detects that this ratio is above the predetermined threshold level, the transceiver 30 can switch operation from the sleep mode to the transmitting mode.

In another embodiment, while the transceiver 30 operates in the sleep mode, the control unit 32 can be configured to examine message traffic between the RFID reader 20 and the RFID transponders 22, such as by monitoring the number of RFID transponders 22 that transmit an RFID signal 26 in response to an interrogation signal 24. So long as the message traffic is above a particular predetermined message traffic threshold, the transceiver 30 can remain in the sleep mode. However, if the control unit 32 detects that the message traffic drops below the message traffic threshold, the transceiver 30 can switch operation from the sleep mode to the transmitting mode. For example, if the number of RFID transponders 22 is known, then the transceiver 30 can switch operation from the sleep mode to the transmitting mode when the number of RFID signals 26 or messages corresponds with less than about 50% of the number of RFID transponders 22. Alternatively, the transponders or a portion thereof can be cloaked to reduce the number of responses.

Figure 10:
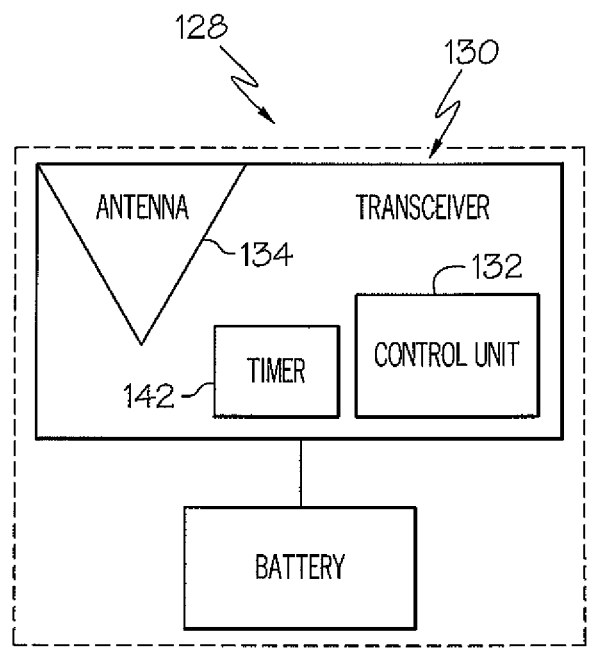
FIG. 10 is a schematic view depicting an RF repeater according to an alternative embodiment.

After the transceiver 30 has operated in the transmitting mode for a predetermined period of time, the transceiver 30 can automatically switch back to the sleep mode (e.g., to conserve energy). For example, as illustrated in FIG. 10, a transceiver 130 in accordance with an alternative embodiment can comprise a timer 142. The timer 142 can be configured to switch operation of the transceiver 130 from a transmitting mode to a sleep mode after a predetermined period of time following receipt by a control unit 132 of an interrogation signal from an associated antenna 134. In one embodiment, the predetermined period of time can be long enough to ensure that the RFID-data from the RFID transponders 22 is properly transmitted to the RFID reader 20.

An RF repeater can further include a power source configured to power its transceiver. In one embodiment, as shown in FIGS. 5-9, the power source can include a battery 40. In another embodiment, the power source can include a capacitor. In addition to or in lieu of a power source, the transceiver 30 can be powered from the interrogation signal 24 or the converted interrogation signal 36 (i.e., passively). In particular, the transceiver 30 can rely upon power provided from the interrogation signal 24 or the converted interrogation signal 36 to power the control unit 32 and/or the antenna 34. It will also be appreciated that the RFID transponders 22 can be active and/or passive. In particular, an active one of the RFID transponders 22 can be powered by a battery, and a passive one of the RFID transponders 22 can be powered by the interrogation signal 24 or the converted interrogation signal 36.

Figure 11:
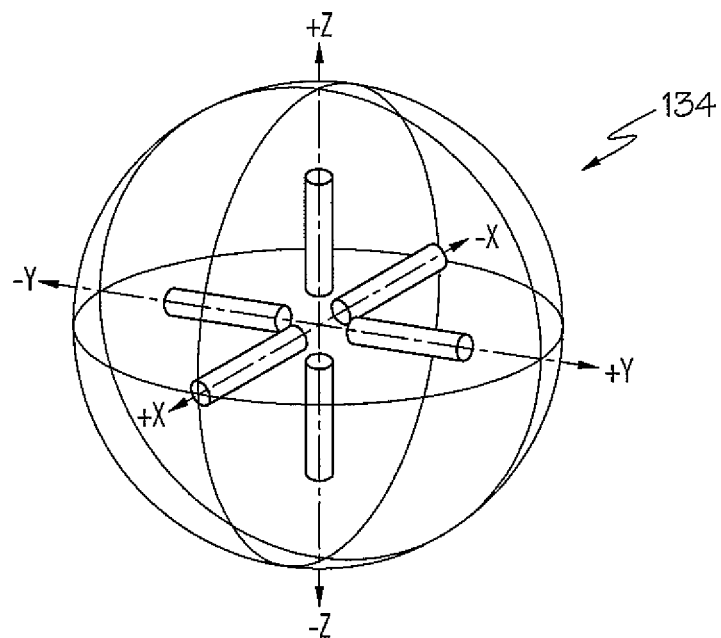
FIG. 11 is a perspective view depicting one embodiment of an antenna that can be associated with the RF repeater depicted in FIG. 5.
Figure 12:
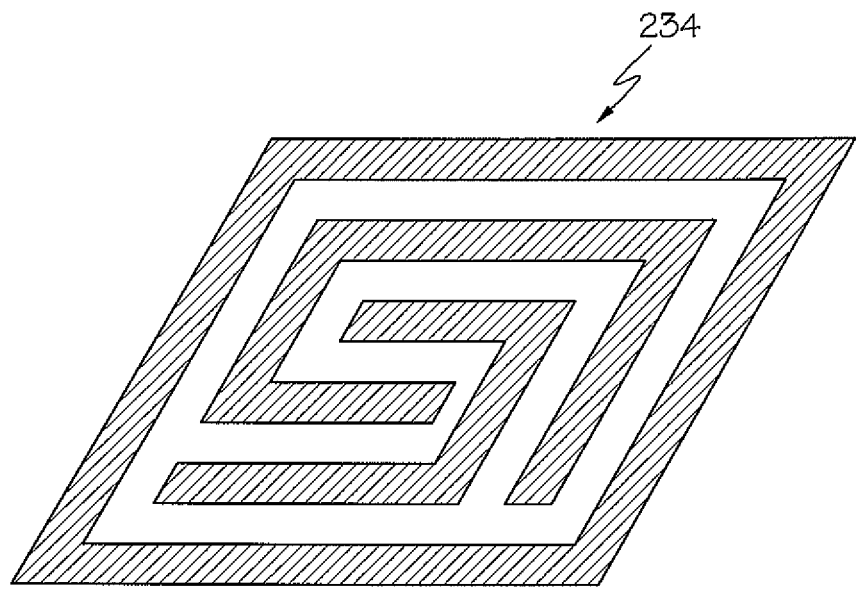
FIG. 12 is a perspective view depicting another embodiment of an antenna that can be associated with the RF repeater depicted in FIG. 5.
Figure 13:
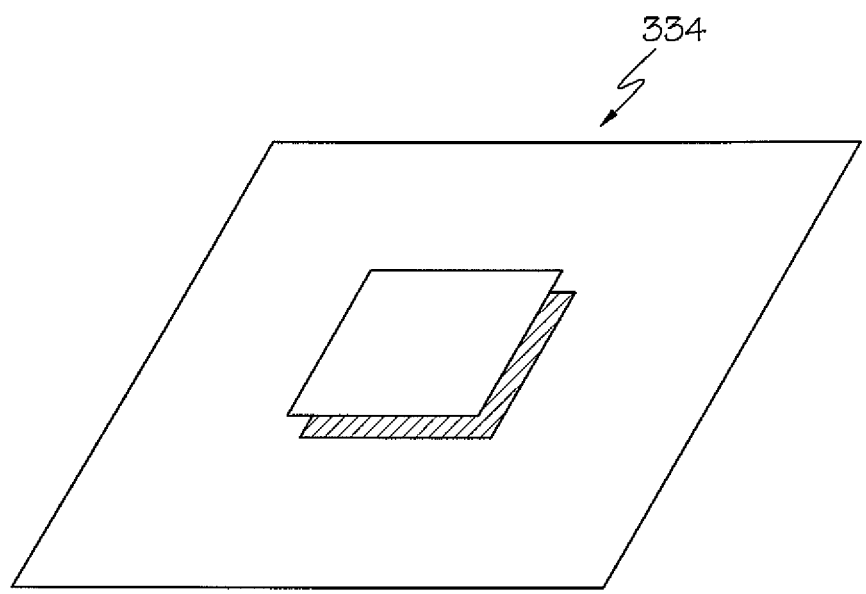
FIG. 13 is a perspective view depicting yet another embodiment of an antenna that can be associated with the RF repeater depicted in FIG. 5.
Figure 14:
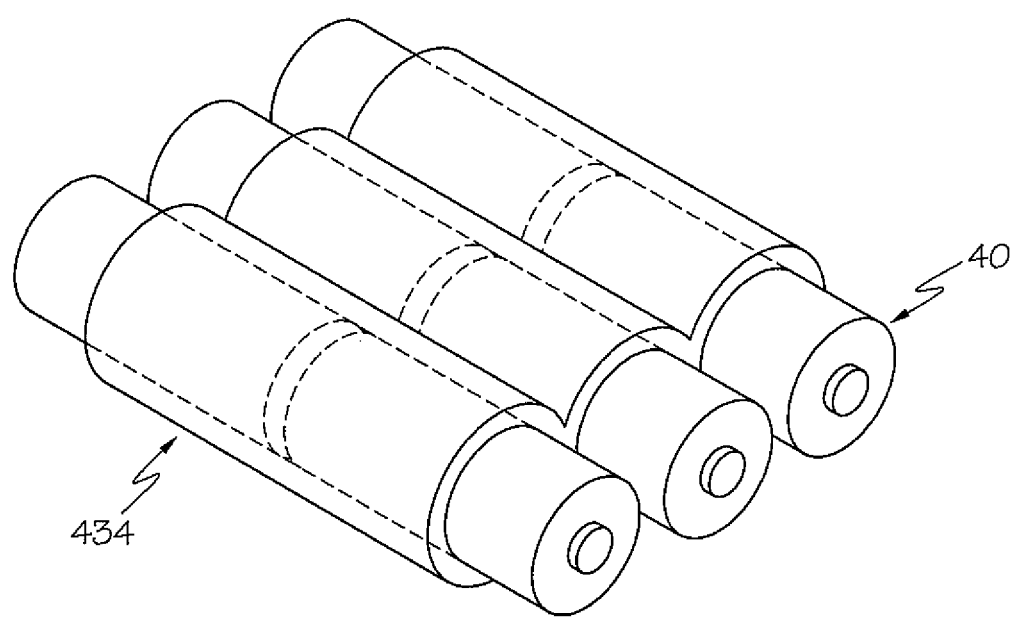
FIG. 14 is a perspective view depicting yet another embodiment of an antenna that can be associated with the RF repeater depicted in FIG. 5.

It will be appreciated that the transceiver 30 can include any of a variety of antenna arrangements that are configured to facilitate reception of the RFID signal 26, reception of the interrogation signal 24, transmission of the converted RFID signal 36, and/or transmission of the converted interrogation signal 38. In one embodiment, the transceiver 30 can include a three-dimensional antenna that can facilitate communication with the RF repeater 28 from any direction. For example, as illustrated in FIG. 11, the transceiver 30 can include a triple-crossed dipole antenna 134. The triple-crossed dipole antenna 134 includes three pairs of dielectric loaded dipoles (e.g., 126, 128, 130) which can intersect each other at degree angles (e.g., to form a three-dimensional arrangement). The interrogation signal 24 from the RFID reader 20 can drive two of the pairs at any given time, thereby allowing the RFID reader 20 to communicate with the RF repeater 28 from any direction as well as transmit a circularly polarized interrogation signal 24. In another example, as illustrated in FIG. 12, the transceiver 30 can include a slot antenna 234. In yet another example, as illustrated in FIG. 13, the transceiver 30 can include a patch antenna 334. In yet another example, as illustrated in FIG. 14, the transceiver 30 can include an antenna 434 that comprises a conductive structure coupled with an exterior surface of the battery 40.

It will be appreciated that the antenna 34 can include any of a variety of suitable materials. In one embodiment, the antenna 34 can be formed from a ceramic material in order to achieve a reduced antenna size. Although the material selected can affect the overall gain of the antenna 34, increased input power to the antenna 34 to achieve a desired equivalent isotropic radiated power can reduce the affect of the material on the overall achieved operating range.

The RF repeater 28 can be configured to be portable so that the RE repeater 28 can be selectively moved between different groups of RFID transponders 22 in order to temporarily facilitate communication between the RFID reader 20 and a certain group of RFID transponders 22. In particular, when the RFID reader 20 and a group of RFID transponders 22 are not communicating directly in an effective manner, the RF repeater 28 can be temporarily placed with the group of RFID transponders 22. Once the RF repeater 28 facilitates effective communication between the RFID reader 20 and the REID transponders 22, the RF repeater 28 can be removed. Then, if the RFID reader 20 and another group of RFID transponders 22 do not communicate directly in an effective manner, the same RE repeater 28 can be temporarily placed with that group of RFID transponders 22 in order to facilitate effective communication or transmission between the RFID reader 20 and the RFID transponders 22.

Figure 15:
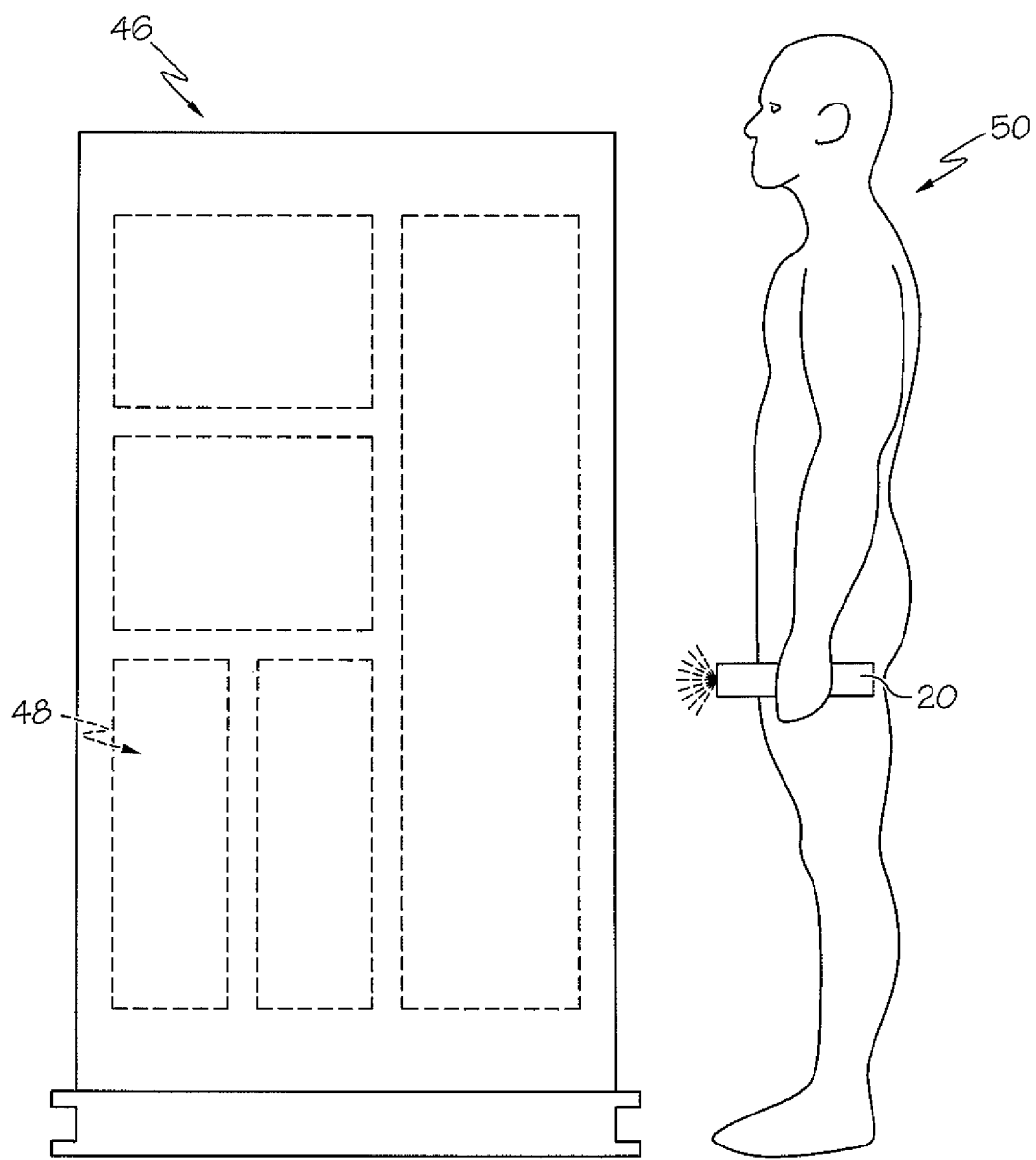
FIG. 15 is an environmental view depicting an RFID reader interrogating RFID-enabled packages disposed within a shipping container.
Figure 16:
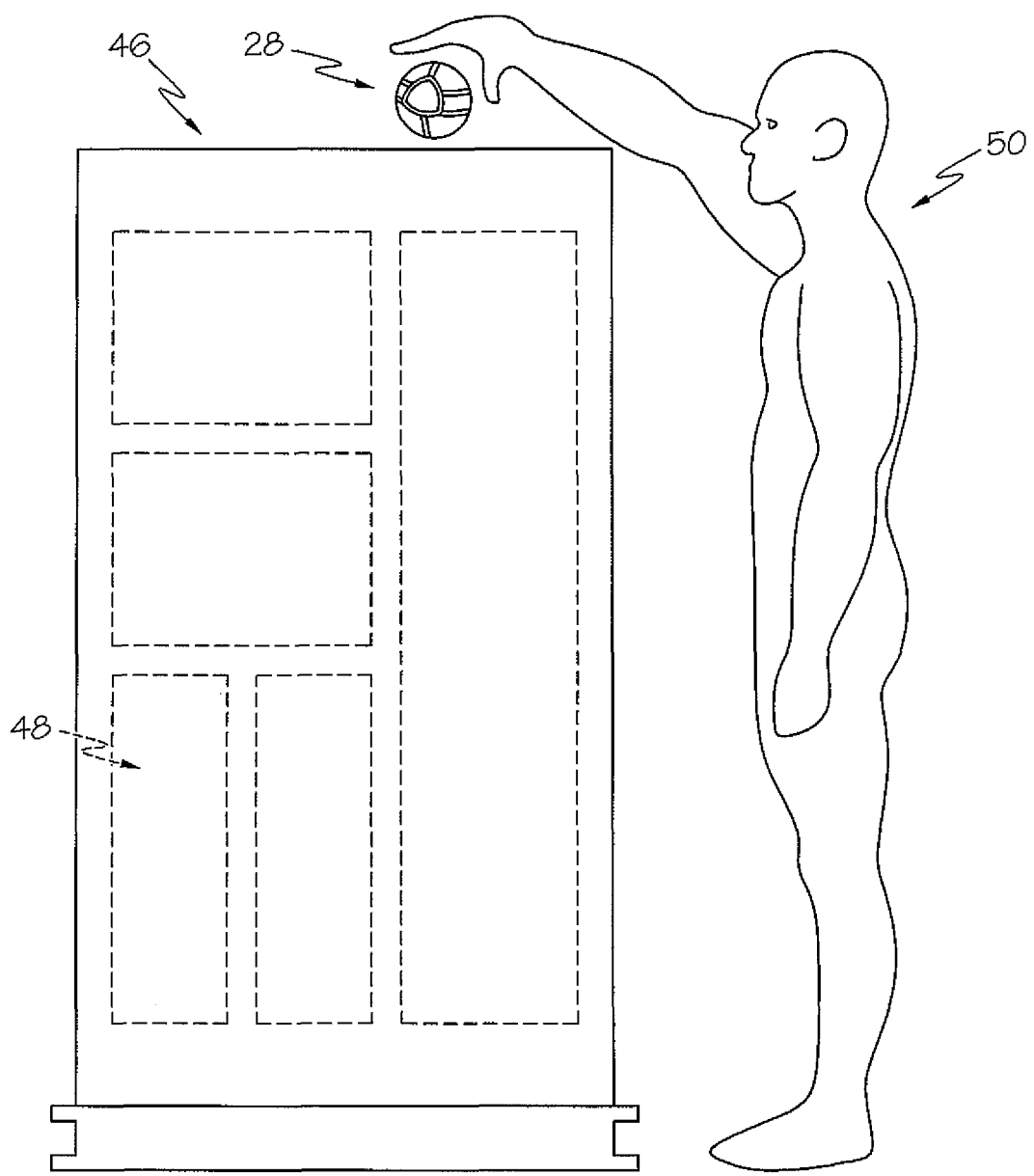
FIG. 16 is an environmental view depicting an RF repeater being provided into the shipping container of FIG. 14.

For example, multiple shipping containers can be maintained at a given facility such as a shipping warehouse. As illustrated in the example of FIG. 15, a shipping container 46 can be loaded with a plurality of RFID-enabled packages 48. Before the shipping container 46 leaves the facility, a user 50 can interrogate the RFID-enabled packages 48 with the RFID reader 20. If any of the RFID-enabled packages 48 does not communicate effectively with the RFID reader 20, the RF repeater 28 can be dropped into the shipping container 46, as illustrated in FIG. 16. Once the RF repeater 28 enables the RFID reader 20 to communicate effectively with the RFID-enabled packages 48, the RF repeater 28 can be removed from the shipping container 46. Subsequently, when other shipping containers are interrogated and the associated RFID-enabled packages do not effectively communicate with the RFID reader 20, the RF repeater 28 can be dropped into or otherwise temporarily associated with those shipping containers. In an alternative embodiment, an RF repeater can be placed in all shipping containers, or all of them known to have experienced problems in the past, before exposure of the shipping container to an RFID reader.

Figure 17:
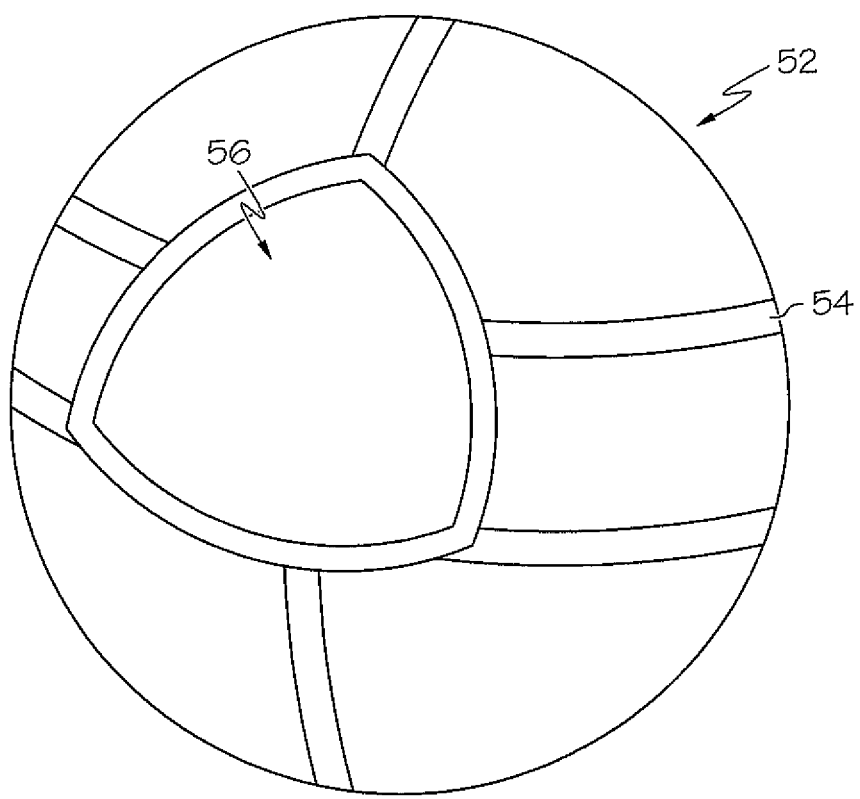
FIG. 17 is a perspective view depicting an RF reader in accordance with one embodiment, wherein a portion of the housing of the RF reader is removed to expose an interior portion.

The transceiver, antenna, battery and/or timer can be disposed within a housing. In one embodiment, and as illustrated in FIG. 17, the RF repeater 28 includes a ball-shaped housing 52. The ball-shaped housing 52 can be formed from a polymeric material and can include reinforcement strips 54. The ball-shaped housing 52 can define a hollow interior 56 that is configured to enclose the transceiver 30, battery 40 and timer 42. It will be appreciated that the housing can be provided in any of a variety of alternative suitable shapes and configurations. In another embodiment, an RF repeater 28 can be removably or permanently integrated into a shipping container (e.g., a pallet, a carton, etc.).

In another embodiment, the RF repeater 28 can be configured to be portable and may be used in operations where effective, accurate, and rapid inventory tracking is desirable, for example, retail operations. Such operations may include operations having rapid inventory turnaround, having high-value inventory, having RFID tags capable of updating a displayed price or other information, and so forth. As illustrated in FIG. 18, the RF repeater 28 can include a substantially planar housing 58 which may be formed from any material, for example a polymeric material, and which may be sized and configured to enclose the transceiver 30, battery 40 and timer 42. Housing 58 can also include an attachment structure 60, which may facilitate attaching, hanging, or mounting the RE repeater 28 in desired locations in the retail operation, (e.g., product display stands, clothing racks, etc.).

At least one RFID reader 20 may be disposed in the retail operation or similar location and configured to communicate with a plurality of RFID transponders 22. Such communications may include interrogation signals, RFID signals and read-write signals. The REID transponders may be associated with different items (e.g., RFID-enabled items) in the location, for example, with various products being sold or distributed at the location. Depending on the number of RFID readers 20 used in the location, a quantity of RFID transponders 22 may be visible to the RFID reader 20. However, the presence of objects that absorb RF frequencies, such as RF-absorbing products, metal structures and products, infrastructure at the location, as well as people, may reduce the visibility, to RFID reader 20, of RFID transponders 22 located in certain areas. This can be demonstrated in FIG. 18 as a weak communication link 62 between the RFID reader 20 and RFID transponders 22 that are located in a low-visibility area, for example. If the low-visibility area is one where there is a rapid turnover of RFID transponders 22, the RFID transponders 22 are associated with high-value products, where anti-theft monitoring is required, where price information or other information on the RFID transponders needs to be updated, and so forth, the weak communication link 62 may be insufficient to provide a reliable read and write communication between RFID reader 20 and RFID transponders 22. Thus, as shown in FIG. 18, an RF repeater 28 may be provided in or proximate to low visibility areas. The RF repeater 28 may relay communications (which may include interrogation signals, RFID signals and read-write signals) between RFID reader 20 to RFID transponders 22, and vice versa. This may be accomplished via strong communication links 64 between RF repeater 28 and RFID transponders 22, and a strong relay communication link 66 between RF repeater 28 and RFID reader 20. Such an arrangement can allow reliable read and write communications, as well as reliable interrogation signals and RFID signals between the RFID transponders 22 and the RFID reader 20. The communications between RFID reader 20, RF repeater 28, and RFID transponders 22 may be accomplished substantially according to any of the embodiments and methods and techniques previously described herein.

In certain situations, it may be desirable to use a portable RFID reader in lieu of, or in addition to, the RFID reader 20. In such situations, a hand-held or otherwise portable RFID reader 68 can be used to communicate with a plurality of RFID transponders 22. Such communications may include interrogation signals, RFID signals and read-write signals. For example, as illustrated in FIG. 19, a portable RFID reader 68 may communicate directly with RFID transponders 22a, wherein the RFID transponders 22a are sufficiently proximate to portable RFID reader 68 such that strong communications links 64a can exist between the RFID transponders 22a and the portable RFID reader 68. For RFID transponders 22b, where a direct strong communications link to the portable RFID reader 68 cannot be established, communications may be relayed via RF repeater 28. This may be accomplished via strong communication links 64b between RF repeater 28 and RFID transponders 22b, and a strong relay communication link 66 between RF repeater 28 and portable RFID reader 68. Such an arrangement can allow the transmission of reliable read and write signals, as well as reliable interrogation signals and RFID signals between the RFID transponders 22b and the RFID reader 20. The communications between RFID reader 68, RF repeater 28, and REID transponders 22a, 22b may be accomplished substantially according to any of the embodiments and methods and techniques previously described herein.

In some embodiments, the RF repeater 28 may be adapted to form a self-configuring network, for example, by recognizing the presence of and communicating with other RF repeaters within a strong communications signal range. For example, as illustrated in FIG. 20, an RFID reader 20 or a portable RFID reader 68 may communicate with a first RF repeater 28a via strong communications links 66. Such communications may include interrogation signals, RFID signals and read-write signals. In the exemplary illustration, there may be no RFID transponders within a strong communications signal range of the REID readers 20, 68, nor within a strong communications signal range of the first RFID repeater 28a. However, a second RF repeater 28b and a third RF repeater 28c may be within a strong communications signal range. Consequently, communications from first RF repeater 28a can be relayed to second and third RF repeaters 28b, 28c via strong relay communications links 70. Second RF repeater 28b can then relay the communications to RFID transponders 22b via strong communications signals 64b, and third RF repeater 28c can relay the communications to RFID transponders 22c via strong communications signals 64c. Response signals from RFID transponders 22b, 22c can then be sent to second and third RF repeaters 28b, 28c, which can relay the signals to first RF repeater 28a, which can relay the signals to RFID readers 20 or 68. The communications between RFID readers 20, 68, RF repeaters 28a, 28b, 28c, and REID transponders 22b, 22c may be accomplished substantially according to any of the embodiments and methods and techniques previously described herein.

In some embodiments, communications between an RFID reader 20 or 68 and an RF repeater 28 may be established by iteratively locating an RE repeater 28 while assessing the ability of the RFID reader 20 or 68 to communicate with a known group of RFID transponders 22 and determining whether the ability of the RFID reader 20 to communicate with the RFID transponders 22 via RF repeater 28 is improved over the ability of the RFID reader 20 to communicate directly with the known group of RFID transponders 22. Similarly, communications between a first and a second RF repeater 28a, 28b may be established by iteratively locating another RF repeater 28b while assessing the ability of the first RF repeater 28a to communicate with a known group of RFID transponders 22 and determining whether the ability of the first RF repeater 28a to communicate with the RFID transponders 22 via the second RF repeater 28b improved over the ability of the first RF repeater 28a to directly communicate with the known group of RFID transponders 22. In other embodiments, an RF repeater 28 may be affixed to a movable platform, for example a trolley or roll cage typically used in stock replenishment, or a cart or trolley used by a consumer while shopping. In such embodiments, the RF repeater 28 may communicate with RFID transponders 22 that are proximate to the RF repeater 28, and relay the communications to an RFID reader 20.

Additionally, as previously discussed, the transceiver 30 of the RF repeater 28 can be configured to alternatively operate in a sleep mode and a transmitting mode, with the transceiver 30 operating in the sleep mode until an event triggers operation of the transceiver 30 in the transmitting mode. In one exemplary embodiment, the transceiver 30 can switch from the sleep mode to the transmitting mode in response to certain types of signals, certain commands or desired data rates. Far example, the transceiver 30 may detect the priority level of a signal and switch operation to the transmitting mode if the detected priority of the signal is above a desired threshold. Thus, a write operation to update the price of an RFID transponder may be considered a "high priority" operation and can induce the transceiver 30 to switch operation to the transmitting mode, while a read operation for inventory tracking may be considered a "low priority" operation, whereupon the transceiver 30 can remain in the sleep mode. The various types of commands and priorities may be distinguished by using diverse data rates for "high priority" and "low priority" operations, by analysis of the command by RF repeater 28, or via any other functionality that enables RF repeater 28 to function as described herein.

In yet another embodiment, a handheld RFID reader 68 may be adapted for mobile inventory tracking by an employee in locations where visibility of RFID transponders 22 is reduced. Such locations may include, for example, areas where metals or fluids are present, or where there exists a high density of REID transponders 22. Such an embodiment may include a read-only capability, and may include indicators showing when RFID transponder data is being collected, and when the collected data is being transferred to the main RFID reader 20 or to the inventory tracking system of the location. The inventory tracking system may include software adapted to send the collected data to a mobile communications device, for example a smartphone being used by the employee, such that the employee may view recent inventory activity and any inventory alerts such as shortages, overages, and so forth.

Turning to FIGS. 21-24, in another exemplary embodiment, an RF repeater can include functionality for modifying information stored in RFID transponders. As shown in FIG. 21, the RFID modifier 100 can include an RFID reader 102, at least one antenna 104 which can be one or both of a near field antenna and a far field antenna, power source 106, and a controller 108. In some embodiments, RFID modifier 100 can include a proximity sensor 110 which may be an infrared sensor, temperature, motion, at least one user-operable control 112, a counter 114, input/output communications 116, and indicators 118. RFID modifier 100 can be adapted to operate independently of a data communications infrastructure, so as to allow the RFID modifier to be utilized in locations where a data communications infrastructure may be unavailable or undesirable. To further independent operation of the RFID modifier, power source 106 may be a battery, or alternatively the device may harvest energy from a source, allowing RFID modifier 100 to operate independently of an external power infrastructure as well. However, power source 106 may provide for connections to an external power source for operation of RFID modifier 100 and recharging of power source 106.

REID modifier 100 can be configured to modify a quantity of unique RFID transponders 122 up to a predetermined quantity limit. The predetermined quantity limit may be changed by an authorized user of RFID modifier 100. Once RFID modifier 100 modifies a quantity of unique RFID transponders 122 that is equal to the predetermined quantity limit, the RFID modifier 100 may not execute any additional modifying operations until a reauthorization procedure is carried out by an authorized user of RFID modifier 100.

RFID modifier 100 may include configurable set parameters for antenna 104. Exemplary set parameters for the antenna 104 of RFID modifier 100 can include power, frequency, hop pattern, and return loss, each of which may be set to desired values by an authorized user of RFID modifier 100. If RFID modifier 100 includes more than one antenna 104, and the return loss value during operation is greater than the desired value, RFID modifier 100 may switch to an alternate antenna wherein the return loss value during operation is less than the desired value.

RFID modifier 100 may further include configurable action parameters, which may need to be met for RFID modifier 100 to execute a modifying operation. The action parameters may be set to desired values by an authorized user of RFID modifier 100. Exemplary action parameters may include, but are not limited to: the RFID transponder 122 to be modified must be a unique RFID transponder that has not been modified previously; the receive signal strength indication (RSSI) value must be between predetermined upper and lower bounds, and/or the unique identifier (UID) count must be greater than zero.

As shown in FIG. 22, the modifying operations may be initiated when proximity sensor 110 detects a container 120 within a desired proximity to RFID modifier 100. Container 120 may include a plurality of RFID transponders 122 therein. Alternatively, the modifying operations may be initiated manually via user-operable control 112. RFID modifier 100 may then modify the RFID transponders 122 within container 120. For each unique RFID transponder 122 modified, RFID modifier 100 may record the UIDs of the modified tag. RFID modifier 100 may further record the quantity of unique RFID transponders 122 modified and compare the total quantity of unique RFID transponders 122 modified to the predetermined quantity limit.

RFID modifier 100 may display the operating status of the RFID modifier via indicators 118. Indicators 118 may be, but are not limited to, light-emitting diodes (LEDs), wherein a green indicator can indicate a 'reading' status, a yellow flashing indicator can indicate a 'standby' status, and a red indicator can indicate a 'finished' status.

The RFID modifier 100 may further display the quantity of unique RFID transponders 122 modified via counter 114. The operator of RFID modifier 100 may utilize counter 114 to compare the quantity of unique RFID transponders 122 modified to the known quantity of RFID transponders 122 within a container 120. If the quantity of unique RFID transponders 122 modified is lower than the known quantity of RFID transponders 122 in container 120, the operator may reorient the container 120 and repeat the operation until all RFID transponders 122 within container 120 have been modified. To aid the operator, the quantity of unique RFID transponders 122 may be reset for each container 120; however, counter 114 may further display the total (i.e. non-resettable) quantity of unique RFID transponders 122 modified, the predetermined quantity limit, and/or the amount of modification operations remaining before the predetermined quantity limit is reached.

Upon completion of all desired modifying operations, or upon reaching the predetermined quantity limit, the operator of RFID modifier 100 may return the RFID modifier 100 to an authorized user, or may utilize input/output communications 116 to enable RFID modifier 100 to communicate with an authorized user. The RFID modifier 100 can then communicate to the authorized user various data (which can include visual and audio as well as text), including, but not limited to, the number of RFID transponders 122 detected by RFID modifier 100, the number of unique RFID transponders 122 modified by RFID modifier 100, the time taken to execute the modifying operations, and so forth. The authorized user may then alter the configuration of RFID modifier 100 as desired, for example, but not limited to, updating or changing the predetermined quantity limit, reauthorizing RFID modifier 100 if the predetermined quantity limit has been reached, varying the above-described action parameters and set parameters, and so forth.

Exemplary uses for RFID modifier 100 may include, but are not limited to, modifying a desired quantity of unique RFID transponders 122, permanently locking a desired quantity of unique RFID transponders 122, or disabling/killing a desired quantity of unique RFID transponders 122. The predetermined quantity limit may be adjusted as desired for each particular use. For example, for disabling RFID transponders 122, the predetermined quantity limit may be set to a low quantity, so as to limit the amount of RFID transponders 122 that can be disabled without reauthorization by an authorized user.

Another exemplary use of RFID modifier 100 may be to modify an RFID transponder 122 so as to identify the RFID transponder 122 as pertaining to a genuine item. For example, as shown in FIG. 23, an RFID transponder may be disposed on a branded item 124. In the exemplary genuineness assurance use, a brand owner may wish to allow a manufacturer to produce a limited number N of branded items 124. The brand owner, being the authorized user of RFID modifier 100, may therefore set the predetermined quantity limit of RFID modifier 100 to N. The brand owner can then send the RFID modifier 100 to the operator, in this case the manufacturer of the branded items 124. As a result, the manufacturer may be able to modify only an N number of RFID transponders 122 with the genuineness identification; due to the predetermined quantity limit, RFID modifier 100 may not allow for modification of any additional RFID transponders 122. Thus, any branded items 124 that the manufacturer produces in excess of the allowed limit may not be modified to be identified as genuine. However, if desired, the predetermined quantity limit may also be set to N+E, where E is a desired percentage of N that can be provided to compensate for any errors that may occur during the modifying operations.

The genuineness modification may be accomplished by RFID modifier 100 as follows. For any RFID transponder 122, the RFID modifier 100 may read the TID memory of the RFID transponder 122, which contains the UID of the RFID transponder 122. The RFID modifier 100 may then use a private key to encode the contents of the TID memory, including the UID, and then write the encoded data to the EPC memory of the RFID transponder 122. Subsequently, RFID modifier 100 may lock the RFID transponder 122. An RFID reader having a corresponding public key can then interrogate an RFID transponder 122 so as to check the genuineness of the RFID transponder 122.

In the event an incorrect RFID transponder 122 has been programmed, the operator may use RFID modifier 100 to deactivate the incorrect RFID transponder 122 by interrogating the incorrect RFID transponder 122 with RFID modifier 100. During interrogation, RFID modifier 100 can verify that the encoded UID to EPC relationship is valid. If the relationship is valid, the operator can then execute a command to deactivate the RFID transponder 122. The RFID modifier 100 can then increment the predetermined quantity limit by one modification operation, essentially reclaiming the incorrect modification operation so as to allow another RFID transponder 122 to be programmed in lieu of the incorrect RFID transponder 122.

Some embodiments of RFID modifier 100 for use with genuineness modifications may be configured as single-use units. For example, such embodiments may be adapted to be protected against physical unauthorized access as well as electronic unauthorized access. Additionally, such embodiments may be completely sealed and may have a non-rechargeable power source 106 that provides sufficient power for performing a number of modifications that is slightly greater than the predetermined quantity limit, with allowance for errors.

Turning to FIG. 24, some embodiments of RFID modifier 100 may include an input/output communications 116 adapted to communicate with devices such as contactless smart cards 140 that are compliant with the ISO14443 standard, as well as mobile communications devices 142 that are compliant with the Near Field Communications (NFC) standard. Communications via smart cards 140 and NFC-compliant mobile devices 142 may be used, for example, but not limited to, to change the parameters of the RFID modifier 100, including the predetermined quantity limit; to transfer private keys or other encryption information to RFID modifier 100, and to retrieve any recorded data or activity logs from the RFID modifier 100. This can allow for additional flexibility in the use of RFID modifier 100; for example, an authorized user may send a smart card 140 to an operator, wherein the smart card 140 includes information regarding the predetermined quantity limit, the private key, and any other desired data. The operator may then utilize smart card 140 to communicate with the RFID modifier 100 so as to alter the parameters of the RFID modifier 100. The operator may then order additional smart cards 142 from the authorized user; for example, the operator may purchase an increase in the predetermined quantity limit from the authorized user. As another example, the above-described operations may be facilitated via an NFC-compliant mobile device 142, wherein the mobile device 142 can establish a secure connection to the authorized user, allowing the operator to request desired changes to the parameters of RFID modifier 100 with minimal delay. Furthermore, this may allow the operator to purchase additional modification operations on a "pay per operation" basis, wherein the operator may purchase a desired number of operations according to a known unit price for each operation. The payment to the authorized user may then be executed via the NFC-compliant mobile device, allowing for "on-demand" increases in the predetermined quantity limit for modification operations.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A method for modifying a plurality of RFID transponders, comprising:
   providing an RFID modifier;
   providing a plurality of RFID transponders;
   activating the RFID modifier, the RFID modifier includes configurable actions parameters that must be met for the RFID modifier to execute a modifying operation;
   verifying that each transponder of the plurality of RFID transponders has a unique UID;

executing a modifying operation on each of the plurality of RFID transponders if the configurable action parameters have been met;

incrementing a counter by the quantity of modifying operations performed; and stopping executing modifying operations when the counter equals a predetermined quantity limit.

2. The method of claim 1, wherein the RFID modifier further comprises:
a housing;
at least one antenna;
a control unit in electrical communication with the antenna;
a trigger; and
a communications device; wherein:
the control unit is configured to perform a quantity of modifying operations on a plurality of unique RFID transponders; and
the control unit is configured to cease performing modifying operations on the RFID transponders once the quantity of performed modifying operations reaches a predetermined quantity limit.

3. The RFID modifier of claim 2, wherein:
the control unit is configured to communicate with an authorized user so as to reset the quantity of performed modifying operations.

4. The RFID modifier of claim 2, wherein:
the control unit is configured to communicate with an authorized user so as to change the predetermined quantity limit.

5. The RFID modifier of claim 2, wherein the trigger activates the control unit to perform a modifying operation.

6. The RFID modifier of claim 2, wherein the trigger is a proximity sensor.

7. The RFID modifier of claim 2, wherein the communication device is adapted to communicate with one or more of a contactless smart card and an NFC-compliant device.

8. The method of claim 1, wherein activating the RFID modifier further comprises activating a trigger.

9. The method of claim 8, wherein the trigger comprises a proximity sensor.

10. The method of claim 1, wherein an RFID transponder of the plurality of RFID transponders comprises a tag identification (TID) memory and an electronic product code (EPC) memory.

11. The method of claim 10, wherein executing a modifying operation further comprises:
reading the tag identification (TID) memory of an RFID transponder;
using a private key to encode the contents of the tag identification (TID) memory; and
writing the encoded contents of the tag identification (TID) memory to the electronic product code (EPC) memory of the RFID transponder.

12. The method of claim 11, further comprising:
contacting an authorized user of the RFID modifier;
communicating, to the authorized user, the value of the counter;
obtaining instructions, from the authorized user, to change the value the counter; and
changing the value of the counter.

13. The method of claim 12, wherein changing the value of the counter further comprises resetting the counter to zero.

* * * * *